(12) United States Patent
Marjelund et al.

(10) Patent No.: US 7,433,334 B2
(45) Date of Patent: Oct. 7, 2008

(54) METHOD FOR ESTABLISHING A COMMUNICATION LINK BETWEEN A USER EQUIPMENT AND A RADIO NETWORK

(75) Inventors: Pekka Marjelund, Espoo (FI); Jukka Vialen, Espoo (FI)

(73) Assignee: Nokia Corporation, Espoo (FI)

( * ) Notice: Subject to any disclaimer, the term of this patent is extended or adjusted under 35 U.S.C. 154(b) by 115 days.

(21) Appl. No.: 09/947,677

(22) Filed: Sep. 6, 2001

(65) Prior Publication Data
US 2002/0071480 A1    Jun. 13, 2002

Related U.S. Application Data

(63) Continuation of application No. PCT/EP99/01614, filed on Mar. 8, 1999.

(51) Int. Cl.
*H04Q 7/38*      (2006.01)
*H04J 3/00*      (2006.01)

(52) U.S. Cl. .................. 370/329; 370/436; 370/437

(58) Field of Classification Search ................. 370/328, 370/329, 331, 338, 352–355, 432, 442, 458, 370/477, 498, 436, 437
See application file for complete search history.

(56) References Cited

U.S. PATENT DOCUMENTS

| | | | | |
|---|---|---|---|---|
| 5,404,355 | A * | 4/1995 | Raith | 370/311 |
| 5,604,744 | A * | 2/1997 | Andersson et al. | 370/347 |
| 5,818,871 | A | 10/1998 | Blakeney, II et al. | |
| 6,101,392 | A * | 8/2000 | Corriveau | 455/458 |
| 6,178,337 | B1 * | 1/2001 | Spartz et al. | 455/561 |
| 6,236,646 | B1 * | 5/2001 | Beming et al. | 370/335 |
| 6,374,109 | B1 * | 4/2002 | Shaheen et al. | 455/434 |
| 6,381,229 | B1 * | 4/2002 | Narvinger et al. | 370/328 |
| 6,567,482 | B1 * | 5/2003 | Popovic' | 375/343 |
| 6,674,765 | B1 * | 1/2004 | Chuah et al. | 370/458 |
| 6,725,039 | B1 * | 4/2004 | Parmar et al. | 455/436 |
| 2005/0152398 | A1 * | 7/2005 | Shin | 370/469 |

OTHER PUBLICATIONS

3rd Generation Partnership Project Technical Specification Group RAN: RAN Functions, Examples on Signaling Procedures, TRI3.01 v<0.0.2>, Feb. 1999.*

TSG-RAN Working Group 3, I3.01 V0.0.0 , RAN Functions, Example on Signaling Procedures, (Feb. 1999), pp. 3-58.*

UTRA User Equipment Capabilities, 3GPP RAN S1.02 v0.0.1 (Feb. 1999).*

(Continued)

*Primary Examiner*—Chi H. Pham
*Assistant Examiner*—Ahmed Elallam
(74) *Attorney, Agent, or Firm*—Squire, Sanders & Dempsey L.L.P.

(57) ABSTRACT

A method for improving the performance of random access when establishing a communication link between a user equipment (UE) and a radio network (UTRAN) the method includes transmitting a random access message (RAM) from the user equipment (UE) to the radio network (UTRAN), wherein the radio random access message (RAM) contains information describing a functional capability (UB_CAPABILITY) of the user equipment (UE). Thereby, the network knows the capabilities of the terminal as early as possible and can thus optimize all functions performed by the network to be in conformity with the terminal capabilities.

15 Claims, 2 Drawing Sheets

OTHER PUBLICATIONS

GSM—Digital cellular telecommunications system (Phase 2+); Mobile radio interface layer 3 specification (GSM 04.08 version 5.10.1 Release 1996); ETS 300 940, Dec. 1998, Cedex, France.

Mouly et al.; "The GSM Sysytem for Mobile Communications", GSM System for Mobile Communications, Comprehensive Overview of the European Digital Cellular Systems, pp. 192-193 XP002098014.

Mouly et al.; "The GSM Sysytem for Mobile Communications", GSM System for Mobile Communications, Comprehensive Overview of the European Digital Cellular Systems, pp. 196-217 XP002107435.

Tero Ojanpera et al.; "Wideband CDMA for Third Generation Mobile Communications", Universal Personal Communications, Artech House, 1998, pp. 144-145, XP002120339.

International Search Report for PCT/EP99/01614.

* cited by examiner

FIG. 2

| INFORMATION ELEMENT | PRESENCE |
|---|---|
| MESSAGE TYPE | M |
| MS IDENTITY | M (if not included in MAC header) |
| ESTABLISHMENT CAUSE | M |
| SIGNALING LINK TYPE | M |
| SIGNAL QUALITY INFORMATION | M |
| UE CAPABILITY | O |
| RADIO ACCESS BEARER TYPE | O |
| OTHER MEASUREMENT RESULTS (PREFERRED CELLS FOR INITIAL ACTIVE SET) | O |

RADIO RESOURCE CONTROL MESSAGE:
EXAMPLE OF DEFINITION

METHOD FOR ESTABLISHING A COMMUNICATION LINK BETWEEN A USER EQUIPMENT AND A RADIO NETWORK

CROSS REFERENCE TO RELATED APPLICATIONS

This application is a continuation of international application serial number PCT/EP99/01614, filed on 8 Mar. 1999, which designated the U.S. and was published under PCT article 21(2) in English.

FIELD OF THE INVENTION

The present invention relates to a method for performing a random access when establishing a communication link between a user equipment and a radio network. Moreover, the present invention concerns respective user equipment and network control devices adapted to such a method, and a telecommunication system composed thereof.

BACKGROUND OF THE INVENTION

Recently, radio telecommunication networks have widely spread. Moreover, the most recent developed networks and/or those networks currently being under development like the so-called third generation or UMTS networks (Universal Mobile Telecommunication System networks) offer an increasing number of services (like internet access, short message services SMS, etc.) to subscribers to the network.

Generally, such UMTS network systems adopt a hierarchic architecture as briefly explained below.

A UMTS network consists of the main parts of a core network CN, a radio access network UTRAN (UMTS terrestrial radio access network), and a user equipment UE. An interface between a user equipment UE (such as a mobile terminal device or mobile station) is referred to as Uu (air interface for uplink UL and downlink DL transmission). An interface between the UTRAN and the core network CN is referred to as Iu.

The core network CN is composed of those parts, which do not relate to the UTRAN such as a mobile switching center MSC and/or a gateway mobile switching center GMSC. A gateway mobile switching center GMSC is adapted to provide an interface of the UMTS network to another network such as the public switched telephone network PSTN or the ISDN network (integrated services digital network) or the Internet.

The UTRAN network consists of radio network subsystems RNS, which communicate with each other via an interface referred to as Iur. An individual radio network subsystem is composed of a radio network controller RNC which communicates with at least one so-called Node_B B via an interface referred to as Iub. A reception area of each Node_B is referred to as cell C.

Herein above, only a rough structural overview of the network system has been given, while it is apparent to those skilled in the art which specific functions and interrelationships exists between the outlines components, so that the networks system need not be described herein in greater detail.

Now, depending on a type of user equipment UE a user utilizes and/or depending on where, i.e. in which radio access network and/or in which radio network subsystem (and/or also of which network operator), the user uses his user equipment, different functions which the user equipment is capable to perform are enabled and/or disabled. Stated in other words, each user equipment has certain capabilities, while not all capabilities are supported by a radio network in which the terminal device is used, or the network offers more functional features than the user equipment is capable to perform.

The capabilities of a user equipment are described in so-called "UE Capability" information in connection with the UMTS network as a third generation telecommunication network. (Formerly, in connection with GSM systems, this kind of information related to terminal devices was referred to as "MS classmark information"). Thus, for effecting communication between a respective user equipment and the radio access network UTRAN, it is necessary that the network has a knowledge of the capabilities of the terminal device.

This will be explained with reference to an example of a connection setup in an existing system, such as for example in the GSM system. (The above explained structure of a UMTS network can to a certain extent be mapped to a GSM system in that a radio network subsystem RNS could correspond to a base station system BSS, a radio network controller RNC could correspond to a base station controller BSC, and a Node_B could to a certain extent be compared to a base station BS).

Now, in the GSM system, when no communication link exists and the user wants to initiate a call, i.e. establish a communication link, an initial random access message requesting for a channel to be assigned is sent from the terminal device MS to the access network. This channel request message CHAN_REQ transmitted on the logical random access channel RACH contains a limited set of information related to the terminal station (user equipment). For example, due to a limited transmission capacity on the RACH channel, this message may merely include an information as to whether the terminal device supports full rate and/or half rate traffic channels.

If a communication can be established, the network sends an access grant message via an access grant channel AGCH to the terminal device and subsequently, dedicated control channels DCCH are established for the signaling between the (previously) requesting terminal device and the radio access network.

After such a signaling link has been established, the terminal device forwards "actual" classmark information (specifying services supported by the terminal device and/or describing the terminal device's capabilities) with an initial Layer 3 message (according to the ISO/OSI layer model) to the network. For example, in the GSM network, such actual classmark information is sent with the first Layer 3 message (=the initial service request message; e.g. a PAGING RESPONSE, LOCATION UPDATING REQUEST, IMSI DETACH, CM SERVICE REQUEST, or CM RE-ESTABLISHMENT REQUEST message). This message is sent by the mobile station to the network piggy-backed in the L2 SABM frames establishing the main signaling link.

Furthermore, a base station controller device BSC has to extract the classmark information from a mobility management MM/connection management CM message before forwarding this message of a higher layer to a mobile service switching center MSC.

For a third generation network like the UTRAN, a proposal has recently been made such that a separate "UE capability" message (corresponding to a GSM classmark message) is to be forwarded from a user equipment UE to the UTRAN immediately after a link has been established.

However, in connection with the above prior solutions or proposals, there are several inconveniences.

Firstly, classmark information (or UE capability information) is received only in Layer 3 signaling, i.e. after a signaling link exists already. Moreover, the classmark information has to be extracted from the higher layer message such as mobility management MM and connection management CM messages. Furthermore, signaling channels like the dedicated control channels SDCCH, SACCH and FACCH are reserved for exchanging measurement reports and can not be used for other purposes. Thus, some initial measurement reports are even "wasted" since there is no actual knowledge of the capabilities of the terminal device at the network side.

In consequence, when getting the (essential or actual) classmark information defining the functional features (e.g. supported services) of the terminal device (user equipment) late, not all features offered by the telecommunication network have been able to be implemented in an optimum way.

SUMMARY OF THE INVENTION

Hence, it is an object of the present invention to solve the above mentioned drawbacks existing in connection with previous solutions, and to provide a method for improving the performance of random access when establishing a communication link between a user equipment and a radio network such that the network can optimize all performed functions in view of the capabilities of the network and the user equipment.

This object is achieved by a method for performing a random access when establishing a communication link between a user equipment and a radio network, said method comprising the step of transmitting a random access message from said user equipment to said radio network, wherein said radio random access message contains information describing a functional capability of said user equipment.

Favorable refinements of the present invention are as set forth in the dependent claims.

Also the present invention proposes accordingly adapted user equipment and radio network control devices as well as a corresponding telecommunication system.

As a result, according to the present invention, there exists an advantage such that the network knows the capabilities of the user equipment as early as possible, and thus all functions the network performs can be optimized in view of the knowledge of the features supported by the user equipment.

Particularly, the radio network controller device RNC receiving relevant parts of UE capability information regarding a connection requesting user equipment as early as possible, can use the received UE capability information already when deciding parameters used for the signaling link on the Layer 2 (L2) and Layer 1 (L1) of the ISO/OSI Layer Model.

This removes the previous necessity for the radio network controller device to decide the L2/L1 parameters somehow "blindly" based only on a requested signaling link type by the user equipment, and without being aware of the functional features/capabilities of the requesting User equipment.

Also, there is no longer a need to extract UE capability information (as it was required in GSM with regard to classmark information) from higher layer messages, such that according to the present invention at least to a certain extent the processing load at the network controller device side is reduced.

BRIEF DESCRIPTION OF THE DRAWINGS

The invention will subsequently be described with reference to the accompanying drawings, in which:

FIG. 2 shows an example for a possible definition of a radio resource control message.

DETAILED DESCRIPTION OF THE PRESENT INVENTION

Figure 1:
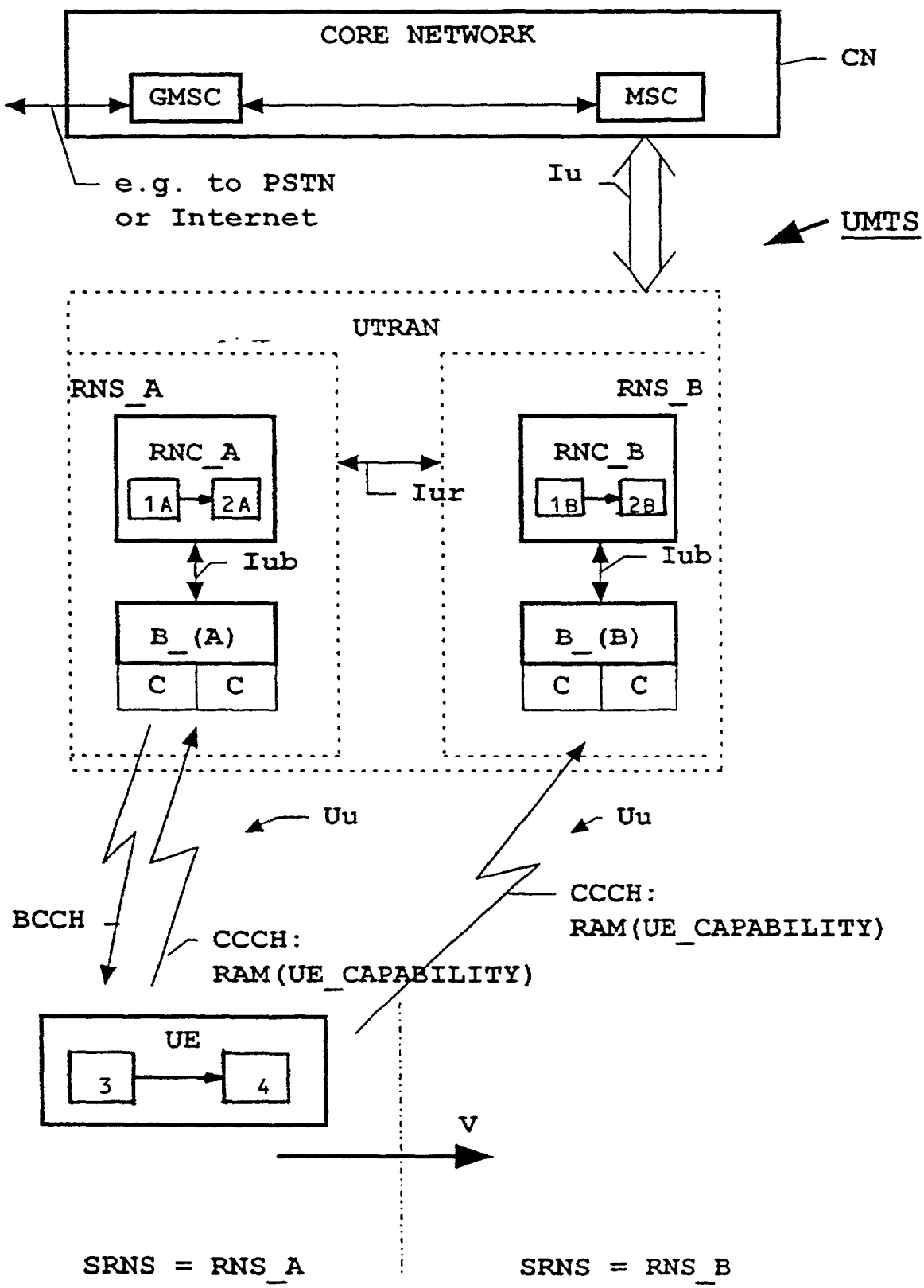
FIG. 1 schematically shows a simplified network architecture together with relevant signals transmitted (as examples), according to the present invention, between individual components thereof.

In contrast to present standards, according to which classmark information and/or UE capability information is transmitted only in the beginning of a communication, i.e. using Layer 3 signaling, according to the present invention, at least part of classmark information is sent already in an initial random access message RAM using a Layer 1 signaling, from a user equipment to a radio network control device RNC.

For example, said random access message RAM is a radio resource control RRC message, and said RRC message is selected from the following group of messages: a radio resource control (RRC) connection establishment request, a RRC connection re-establishment request, a handover request (soft handover, hard handover, as well as handover between UTRAN and GSM is conceivable), a cell update request, a URA update request (URA=UTRAN Registration Area), a SRNS relocation request (SRNS=Serving Radio Network Subsystem).

Of course, although this list of examples is intended to as complete as possible, other messages already defined in or still to be defined for telecommunication standards could be included in the list, to be used in connection with the present invention. For example, other messages specified in document TR I3.01 of February 1999 of the $3^{rd}$ Generation Partnership Project (3GPP), Technical Specification Group RAN, "RAN Functions, Examples on Signaling Procedures" could be used in connection with the present invention.

Moreover, since the transmission capacity for the random access message transmitted on a common control channel CCCH such as for example the random access channel RACH is limited, preferably only a selected part (subset) of classmark parameters is included in the initial message.

The message as such is carried as a payload in a random access burst, and the burst has been modified (as compared to existing standards) in order to carry the (additionally included) UE capability (MS classmark) information.

To this end, the data contained in a data field of the burst could be subjected to an enhanced modulation and/or the data could be compressed coded or the like.

With respect to the UE capability information (MS classmark information) to be included in the initial random access message, those information should preferably be included which describe the functional capabilities of the terminal device related to the interaction with an access network UTRAN of the overall telecommunication network. For example, the following (non limiting list of examples of) UE capability parameters could be included in the initial random access message, which define: the output power (maximum average output power of the user equipment and spectral mask), a downlink multi-code capability (capability of supporting multi-code in downlink), an uplink multi-code capability (capability of supporting multi-code in uplink), a multi-code service multiplexing capability (capability to multiplex services on separate set of physical channels), a maximum number of dedicated channels (DCH:s) (maximum number of simultaneously multiplexed transport channels), carrier raster, frequency bands (capability to support other frequency bands than the core band used in a UMTS band), an UTRA mode capability (FDD only, TDD only, FDD/TDD), a multi-mode support (UTRA, GSM, other systems), a variable duplex distance (FDD) (support for other channel spacing than 190 MHz), a chip rate (FDD) (support for other chip rates than 4.096 mcps), a spreading factor (FDD) (support for spreading factors lower than 16), a channel coding and interleaving (support for service specific channel coding), a number of radio links in macro diversity (FDD), a transport channels (support for other transport channels and combinations than mandatory ones, e.g. downlink shared channels (DSCH), uplink shared channels (USCH), Fast Uplink Signaling Channel (FAUSCH), ODMA channels), a inter system handover capability (capability to measure and handover to other systems). Moreover, the UE Capability information may comprise a revision level, supported ciphering algorithms, UE short message capabilities, UE multicast service capabilities, UE group call capabilities, and an SMS_VALUE (Switch-Measure-Switch; the SMS field indicates the time needed for the mobile station to switch from one radio channel to another, perform a neighbour cell power measurement, and switch from that radio channel to another channel).

Nevertheless, for example, other UE capability information as specified in document 3GPP RAN S1.02 of February 1999 of the $3^{rd}$ Generation Partnership Project (3GPP), "UTRA User Equipment Capabilities" could be used in connection with the present invention.

Also, particularly in case when a user equipment supports inter system handover capability (i.e. the capability to measure and handover to other systems such as the GSM system), then UE capability information could optionally be supplemented by GSM specific MS classmark information to be included in the random access message. Such MS classmark information is for specified in GSM recommendation GSM 04.08, Version 6.3.0, chapter 10.5.1.5., and may include all MS classmark 1, 2, and 3 information listed therein.

Which UE capability information (MS classmark information) is actually to be included in the initial random access message is selectable. The selection can be achieved already upon manufacturing the terminal device, or is to be selected by the user, depending on respectively favored functional features desired to be optimized. Also, the selection could be automated in that the selection is performed in response to a respective command or information received by a user equipment via a broadcast control channel BCCH from a respective Node-B of a radio network subsystem RNS.

Now, with reference to the drawings, FIG. 1 schematically shows a simplified network architecture together with relevant signals transmitted, according to the present invention, between individual components thereof.

Since the general network architecture of a UMTS network has been described herein above, a repeated description thereof is omitted here.

In brief, FIG. 1 illustrates a UMTS telecommunication network composed of a core network CN and an UTRAN access network which communicate with each other via the Iu interface. The illustrated UTRAN radio access network consists of two radio network subsystem s RNS_A, RNS_B. Each subsystem RNS_A, RNS_B comprises a radio network controller RNC_A, RNC_B respectively. Further, associated to each radio network controller device RNC is at least one Node_B, i.e. B_(A), B_(B), respectively, (comparable to a radio transceiver device BS).

Each of the Node_B's defines by its radio coverage area so-called cells C and informs a mobile station MS as a user equipment present in the cell of relevant radio parameters via a respective broadcast control channel BCCH.

For the further explanations, it is now assumed that the user equipment is present in a cell C of the RNS_A, so that the RNS_A is considered as the serving RNS (SRNS) and requests for a call (communication link) to be established (either to another user equipment (not shown) or to a PSTN network). Moreover, the terminal device is moving (as indicated by an arrow labeled "v") to a cell associated to another radio network subsystem RNS and crosses "a border" (indicated as a dashed line in the figure) between the two subsystems.

When a communication link is to be set up (on demand of the user by for example switching on his terminal and/or dialing), the user equipment firstly performs a preprocessing. Such a preprocessing comprising at least the steps of acquiring synchronization to a cell of said network and listening to the broadcast control channel BCCH of said cell to obtain the information relating to said random access channel. Furthermore, within such a preprocessing the further steps of selecting at least preamble spreading code/message scrambling code, a spreading factor for a message part, estimating a downlink path loss and determining the required uplink transmit power, selecting an access slot and signature from available access slots and signatures, transmitting a preamble, and detecting an acquisition indicator can be performed. Since these steps as such are not critical to the present invention, a detailed description thereof is omitted. Moreover, although these steps as described herein above are specific for a frequency division duplex FDD operation, the present invention is not limited thereto, so that also an appropriate preprocessing for TDD operation (time division duplex) could be performed.

Subsequently, when the user equipment UE has obtained the necessary information regarding the random access channel RACH and a communication link is to be set up, the user equipment accesses the random access channel RACH as a common control channel CCCH, and forwards a random access message to a serving Node_B (in the illustrated case: Node_B B_(A)) of the serving radio network subsystem RNS_A.

The initial random access message, according to the present invention, includes at least a part of UE capability (and/or MS classmark information) UE_CAPABILITY (examples of which were given above) related to the user equipment and describing functional capabilities of the terminal device. In the user equipment UE, an inserting means 3 can be provided for inserting the UE capability information. The inserting means 3 is connected to a transmitting means 4 arranged for transmitting the initial random access message to the serving Node_B.

Among UE capability information elements it can be distinguished between access network (UTRAN) and core network (CN) specific ones. Preferably, those related o the access network UTRAN are to be included in the radio resource control RRC message transmitted in the initial random access message on the RACH channel of the common control channels CCCH from the user equipment UE to the radio network controller device RNC_A of the serving radio network subsystem RNS_A.

Both radio network controller devices RNC_A and RNC_B comprise a receiving means 1A and 1B, respectively, and an extracting means 2A and 2B, respectively. The receiving means 1A, 1B is arranged to receive the initial random access message and the extracting means 2A, 2B is arranged to extract the UE capability information from the initial random access message.

The RRC message is carried as payload in a medium access control (MAC) access request message on the RACH channel. Such a medium access control MAC access request message is specified in "MAC protocol specification", chapter 9, of the 3GPP S2.21 document of January 1999. In brief, a MAC data PDU (protocol data unit) consists of an optional MAC header and a MAC service data unit MAC_SDU, both having variable size. The MAC header contains a C/D filed for identification of the logical channel class, i.e. whether it carries CCCH (like RACH) information or dedicated logical channel information. Furthermore, a C/T filed is provided for identifying of the logical channel instance when multiple logical channels are carried on the same transport channel. Finally, the header contains an UE-Id field which provides an identifier of the user equipment UE. The RRC message such as an RRC CONNECTION REQUEST message is included in the MAC SDU data field.

From a physical point of view, the (random access) RRC message is transmitted in the message part (10 ms length) of the Physical Random Access Channel, which message part is preceded by at least one preamble part. For details, reference is made to chapter 5.2. of the paper "UTRA FDD; Transport Channels And Physical Channels" of 3GPP RAN S1.11 of February 1999.

Now, returning to FIG. 1, the terminal device is assumed to be moving to another serving radio network subsystem, i.e. RNS_B as illustrated in FIG. 1, so that not only a handover but a SRNS relocation request (SRNS=serving radio network subsystem) will be necessary. Then, a corresponding RRC message, namely, a SRNS relocation request will be forwarded from the user equipment to the radio network controller RNC_B. In such a case, a new communication link is to be established with another radio network subsystem (or Node_B, respectively). Then, at least a part of the UE capability information is inserted by the inserting means 3 into the SRNS relocation request message which is transmitted by the transmitting means 4 on the RACH channel (common control channel CCCH).

Upon receipt of a respective random access message RAM by the receiving means 1B and subsequent extraction of the included UE capability information by the extracting means 2B, the radio network control device RNC_B establishes a communication link using the information contained in the message, to thereby enable an optimum communication link (in terms of available services) to be established from the very beginning of the communication.

FIG. 2 shows an example for a definition of a radio resource control message, particularly a so-called RRC CONNECTION REQUEST message, in terms of information elements contained therein, according to the present invention.

Whether an individual information element has to be contained therein and is thus mandatory or can optionally be included therein, is indicated by M and/or O, respectively, as indicated in the right column in FIG. 2.

As mandatory information elements, the message type, the "reason", i.e. the cause for establishing the link, and the signaling link type have to be included. Also, signal quality information is necessarily to be included. (If the identity of the user equipment is not already included in the MAC header, also the identity of the terminal device (e.g. TMSI or MSI) is mandatory to be included in the RRC CONNECTION REQUEST message.)

Optionally, still further information (OTHER MEASUREMENT RESULTS (PREFERRED CELLS FOR INITIAL ACTIVE SET)) could be included such as a radio access bearer type*N1 (related to the preferred (primary) cell of connection), other measurement results related to cell parameters of additional cells (in case of diversity is to be established via preferred cells for an initial active set) such as the ID of the additional and/or primary cell, the measured time difference to said additional cell as compared to the primary one, etc.

Of course, with the present invention being implemented, also UE_CAPABILITY information is (optionally) to be included in the RRC CONNECTION REQUEST message, which is the first message transmitted by the user equipment when setting up an RRC connection to the network. This message is always conveyed by the CCCH logical channel and RACH transport channel.

The information elements described above have the following meaning: MESSAGE TYPE defines the RRC message of possible RRC messages (cf. above), ESTABLISHMENT CAUSE corresponds to the establishment cause given by a mobility management MM sublayer, SIGNALING LINK TYPE indicates layer 2 and layer 1 parameters needed for the signaling link, SIGNAL QUALITY INFORMATION represent the measured BCCH signal interference ratio SIR used for determining initial downlink power when setting up the dedicated physical channel. Cell ID is the identification of the cell to be included in the active set from the beginning. To save space in the initial RACH message, the CELL ID is compressed as the concerned cell ID subtracted from the primary access cell ID, which is identified by the PRACH channel that is being used. Another possibility is that the CELL Ids in the initial RACH message are only pointers to the neighbour cell list broadcasted on BCH (thus, CELL ID=0 refers to first cell in the neighbour cell list, ID=1 refers to the second cell in the neighbour cell list etc.). The measured time difference between downlink transmissions of candidate cells listed as references to the primary cell.

Of course, the above list has been given as an example only, and thus various other information elements (not shown in FIG. 2) could at least optionally be also included in the message.

Thus, as has been described herein before, the present invention proposes a method for improving the performance of random access when establishing a communication link between a user equipment and a radio network, said method comprising the step of: transmitting a random access message from said user equipment to said radio network, wherein said random access message contains information describing functional capabilities of said user equipment.

Thereby, the network knows the capabilities of the terminal as early as possible and can thus optimize all functions performed by the network to be in conformity with the terminal capabilities.

It should be understood that the above description and accompanying figures are merely intended to illustrate the present invention by way of example only. The preferred embodiments of the present invention may thus vary within the scope of the attached claims.

The invention claimed is:

1. A method comprising:
transmitting a random access message that includes a layer 3 classmark information message from a user equipment to a radio network, wherein said random access message also contains information describing a functional capability of said user equipment, wherein the functional capability is different from the classmark information,
wherein the functional capability information is sent before a communication link between the user equipment and the radio network has been established,
wherein the user equipment is a communication link originating user equipment, and
wherein said random access message is transmitted on a random access channel representing a transport channel of a medium access control protocol.

2. The method according to claim 1, further comprising:
performing a preprocessing before transmitting said random access message, wherein said preprocessing comprises acquiring synchronization to a cell of said network, and listening to the broadcast control channel of said cell to obtain the information relating to said random access channel.

3. The method according to claim 2, wherein said preprocessing further comprises
selecting at least preamble spreading code/message scrambling code, a spreading factor for a message part,
estimating a downlink path loss and determining the required uplink transmit power,
selecting an access slot and signature from available access slots and signatures,
transmitting a preamble, and
detecting an acquisition indicator.

4. The method according to claim 1, wherein
said information describing functional capabilities of said user equipment consist of at least one of the following parameters
output power,
downlink multi-code capability,
fluplink multi-code capability,
multi-code service multiplexing capability,
maximum number of dedicated channels,
carrier raster,
frequency bands,
Universal Mobile Telecommunications System Terrestrial Radio Access mode capability,
multi-mode support,
variable duplex distance,
chip rate,
spreading factor,
channel coding and interleaving,
number of radio links in macro diversity,
transport channels,
inter system handover capability,
revision level,
supported ciphering algorithm,
user equipment short message capability,
user equipment multicast service capability,
user equipment group call capability, and
a short message service field indicating the time needed for the mobile station to switch from one radio channel to another, perform a neigbor cell power measurement, and switch from that radio channel to another channel.

5. The method according to claim 1, further comprising:
selecting said information describing functional capabilities of said user equipment included in said random access message.

6. The method according to claim 5, wherein said selecting comprises preselecting said information describing functional capabilities upon manufacturing said user equipment.

7. The method according to claim 5, wherein said selecting comprises selecting said information describing functional capabilities by an operator of said user equipment, depending on respectively favored functional features.

8. The method according to claim 5, wherein said selecting comprises automatically selecting said information describing functional capabilities according to information received by said terminal device via a broadcast control channel of a cell of said radio network.

9. An apparatus, comprising:
transmitting means for transmitting a random access message including information describing a functional capability to a radio network;
means for forwarding classmark information from the apparatus to the radio network before a communication link to the radio access network is established, wherein the functional capability is different from the classmark information; and
inserting means for inserting an information describing a functional capability of said apparatus into said random access message,
wherein the functional capability information is inserted and transmitted before the communication link has been established,
wherein the apparatus is a communication link originating user equipment, and
wherein said random access message is transmitted on the random access channel representing a transport channel of a medium access control protocol.

10. An apparatus, comprising:
receiving means for receiving a random access message, wherein the random access message includes information describing a functional capability, and a classmark information message from a user equipment, wherein the functional capacity is different from the classinark information; and
extracting means for extracting an information describing a functional capability of said user equipment from said random access message, wherein the functional capability information is extracted before a communication link to the user equipment has been established and the user equipment is communication link user equipment, and
wherein said random access message is received on the random access channel representing a transport channel of a medium access control protocol.

11. A system comprising:
at least one user equipment comprising transmitting means for transmitting a random access message including a classmark information message to a radio network, and inserting means for inserting information describing a functional capability of said user equipment, which is different from the classmark information, into said random access message; and
at least one radio network control device comprising receiving means for receiving said classmark information message from said user equipment, and extracting means for extracting said capability information of said user equipment from said random access message,
wherein the capability information is sent before the communication link has been established,
wherein the user equipment is a communication link originating user equipment, and
wherein said random access message is transmitted on a random access channel representing a transport channel of the medium access control protocol.

12. An apparatus, comprising:
a transmitter configured to transmit a random access message to a radio network;
a forwarding unit configured to forward classmark information from the apparatus to the radio network before a communication link to the radio network is established; and
an inserting unit configured to insert an information describing a functional capability of said apparatus, which is different from the classmark information, into said random access message,
wherein the functional capability information is inserted and transmitted before the communication link has been established,
wherein the apparatus is a communication link originating user equipment, and wherein said random access message is transmitted on the random access channel representing a transport channel of a medium access control protocol.

13. An apparatus, comprising:
a receiver configured to receive a random access message and a classmark information message from said user equipment; and
an extracting unit configured to extract an information describing a functional capability of said user equipment, which is different from the classmark information, from said random access message, wherein the functional capability information is extracted before the communication link has been established and the user equipment is communication link user equipment, and wherein said random access message is received on the random access channel representing a transport channel of a medium access control protocol.

14. The apparatus according to claim 13, wherein said extracting unit is further configured to read said capability information and to establish said communication link using said capability information contained in said random access message.

15. The apparatus according to claim 13,
wherein said information describing functional capabilities of said user equipment consist of at least one of the following parameters,
output power,
downlink multi-code capability,
uplink multi-code capability,
multi-code service multiplexing capability,
maximum number of dedicated channels,
carrier raster,
frequency bands,
Universal Mobile Telecommunications System Terrestrial Radio Access mode capability,
multi-mode support,
variable duplex distance,
spreading factor,
channel coding and interleaving,
number of radio links in macro diversity,
transport channels,
inter system handover capability,
revision level,
supported ciphering algorithm,
user equipment short message capability,
user equipment multicast service capability,
user equipment group call capability, and
a short message service field indicating the time needed for the mobile station to switch from one radio channel to another, perform a neighbor cell power measurement, and switch from that radio channel to another channel.

* * * * *